UNITED STATES PATENT OFFICE.

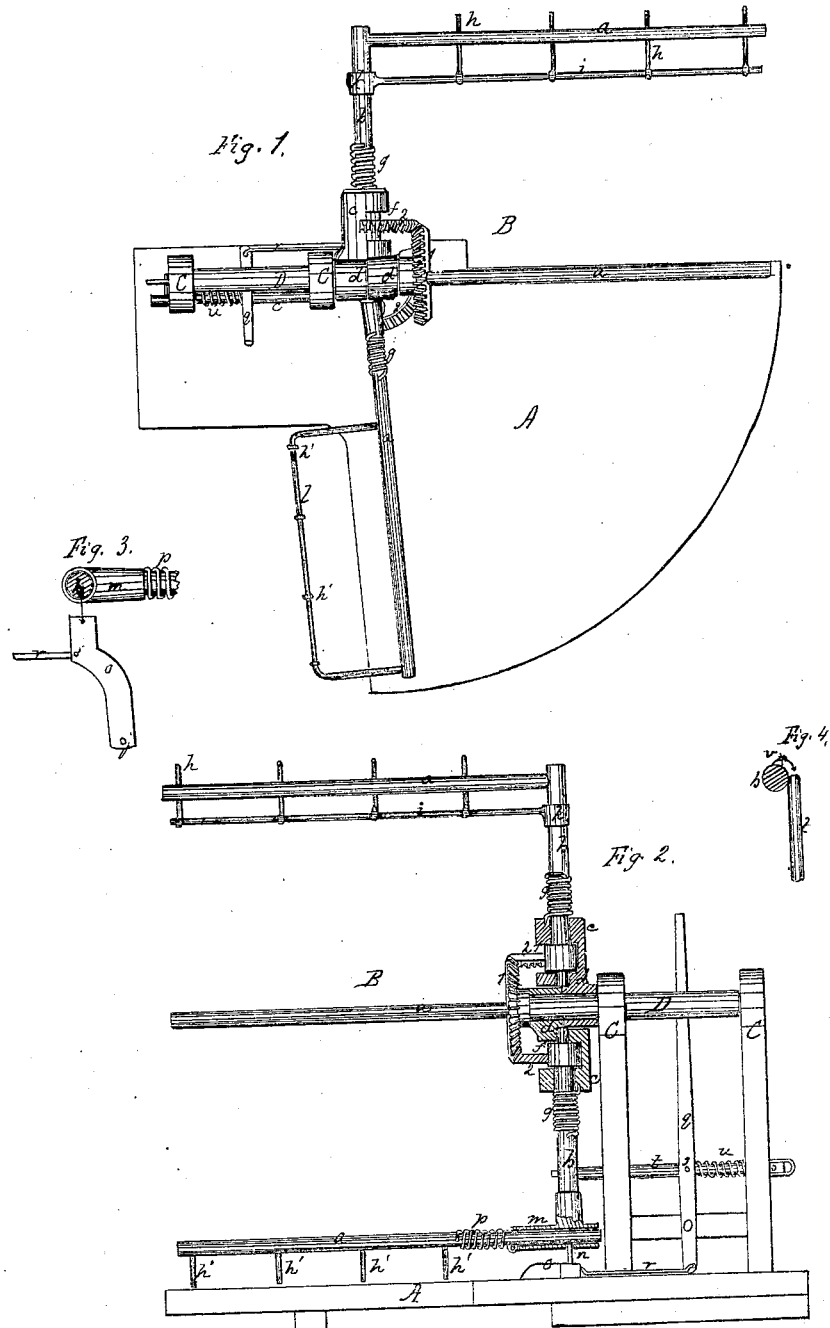

AARON PALMER AND CHARLES W. PALMER, OF BROCKPORT, NEW YORK.

IMPROVEMENT IN HARVESTER-RAKES.

Specification forming part of Letters Patent No. 87,963, dated March 16, 1869.

*To all whom it may concern:*

Be it known that we, AARON PALMER and CHARLES W. PALMER, of Brockport, in the county of Monroe and State of New York, have invented certain new and useful Improvements in Combined Reels and Rakes for Harvesters; and we do hereby declare that the following is a full and exact description thereof, reference being had to the accompanying drawings, making part of this specification.

Figure 1 is a plan of our improved arrangement; Fig. 2, a sectional elevation of the same; Figs. 3 and 4, detail views.

Like letters of reference indicate corresponding parts in all the figures.

In this invention the reel of a harvester is so arranged, in connection with a quadrant or segmental platform, that the arms or floats of said device perform the ordinary functions of a reel, and when they arrive at or near the front edge of the platform, they, or any number of them, have a sweeping movement around an axis over the platform, thereby serving the additional purpose of rakes, depositing the gavels on one side, at right angles to the path of the machine, and out of the way of the team and machine on their return to cut the next swath.

Our invention consists in the construction, arrangement, and combination of parts, substantially as hereinafter set forth.

In the drawings, A indicates the ordinary quadrant or segmental platform of a harvester, and B indicates the reel, which is hung on shaft D in standards C C, or in any ordinary manner.

A portion or all of the floats $a$ $a$ of the reel, as may be desired, are made fast to arms $b$ $b$, which rest loosely and turn in boxes or bearings $c$ $c$, jointed at $d$ $d$ to turn freely on shaft D. Cog-segments 2 2 are made fast to the arms $b$ $b$, projecting out through slots $f$ $f$ of boxes $c$ $c$, and these segments gear with cog-wheel 1, made fast to the end of the reel-shaft. Springs $g$ $g$ are also connected with the arms $b$ $b$ and boxes $c$ $c$.

A portion or all of the floats, as may be desired, are fitted with teeth $h$ $h$, in order to act as rakes. We prefer to make these teeth pass freely through the floats and attach to heads $i$ $i$, which adjust higher or lower on the arms $b$ $b$ by collar $k$ and set-screws, or equivalent, as clearly shown. The rakes may thus be adjusted to operate in tall or short grain by adapting to the vertical adjustment of the reel itself. We also prefer to attach to any one or all of the floats an auxiliary head, $l$, projecting rearward, and holding teeth $h'$. In this case the float to which said auxiliary head is attached is made to turn in a bearing, $m$, to bring the head down upon the cut grain lying on the platform by means of a stem, $n$, that strikes upon a cam-arm, $o$, pivoted at $j$, and lying flat on the platform. The reaction to raise the head again, when it has passed the platform, is produced by a spring, $p$, or any equivalent device.

The cam-arm $o$ is thrown to one side, at any time, out of the track of stem $n$ by lever $q$ through connection $r$, in which case the head $l$ rides high and does not act. This head acts not only as an auxiliary in raking off the grain, but it also serves to hold the grain down flat by reaching over on the stalks of the grain, which are elevated on a windy day. It also prevents grain which, from any cause, comes on the platform at an angle from swinging around parallel to the rake-head, and being discharged in a long string instead of a square gavel.

The lever $q$, pivoted at $s$, connects with a rod, $t$, running loosely through standards C C, and pressed forward to the proper degree by spring $n$. The inner end of this rod comes to just such a position that the arms $b$, connecting with the floats, strike against it in the revolution of the reel, and thereby causes the floats to perform the sweep over the platform, releasing, by the striking of cam $v$ against the end of the rod, as will presently be described.

The operation of the machine, constructed as described, will be readily understood. When the floats are in front of the platform, in the place for bending the grain thereon, they stand in their natural position, or in the line of a cylinder projecting the width of the platform; but the moment they reach the front edge of the platform the arms $b$, that carry the floats constituting the rake-heads, strike the end of the rod $t$, and the still revolving motion of the reel will cause the cog-wheel 1 to turn segment-gears 2, and the said rake will sweep over the quadrant-platform with the arms *b*, forming an axis.

At the time the sweep is completed the cam *v*, coming around, strikes the end of rod *t*, and pushes it back sufficiently for the arm to pass, when the reaction of spring *q* will cause the arm to turn, and segment 2, turning on gear 1, will bring the rake-head in place to act as a float again.

No difficulty will be experienced from the leverage upon the base or inner end of the floats as they begin to act as rakes, since the fulcrum on which the leverage acts comes in a line directly under the engagement of the gearing, and the outer end of the float experiences the greatest resistance. At the same time that any one of the floats is performing the function of a rake the balance of the floats are performing the natural office of a reel, so that there is no interruption to the action.

The simple reversing of the lever *q*, as indicated by red lines, Fig. 21, throws both the rod *t* and the cam-arm *o* out of engagement with the floats, and the device then simply acts as a reel. This is of importance in thin grain, since a sufficient quantity may be allowed to gather on the platform before it is raked off. Instead of this action of the lever *q* throwing the parts *t o* out of gear, the action may be reversed and the lever employed to throw them in gear.

We are aware that a reel has before been made to act the part of a rake. In one case, where the reel is supported at both ends, the arms *b* are made to slide downward through the bearings in which they rest on the reel-shaft, and as the floats strike on the platform the arms extend downward, allowing the teeth to keep in contact with the platform; but in such case the delivery is directly in the rear, and the raking movement is very small, since the sliding motion of the reel-arms is limited, and the grain must be taken up before the machine comes round again. In another case the rake-arms, hung on a vertical shaft, travel over a cam-surface, striking into the grain at the front, sweeping over the platform, and elevating at the rear and passing in an inclined position to the front again. In such case, as the rake-head comes down the incline to strike in the grain, the heel or base strikes first, and the consequence is, that the grain is bent to the platform in a very irregular manner, and deposited thereon at an angle to the cutter-bar, which angle is in the wrong direction. Also, the outer end, which has a greater sweep, strikes into and passes over a quantity of grain which it cannot bring to the platform, and, by thus passing over and combing through it, thrashes it.

Neither of these plans has any relation to ours. It is our object to employ the ordinary old-fashioned form of the reel, which always strikes square into the grain, and make the same floats move horizontally over the quadrant-platform by simply gradually turning to or near a right-angled position from their course, thereby sweeping the grain into the gavel by a side delivery, the only effectual method of depositing the grain out of the way of the succeeding turn or bout of the machine.

We disclaim the combination of a rake with a reel, when the rake itself is not sustained upon one or more of the radial arms of the reel, as we are aware that a rake-head has been attached to revolve with the reel-shaft, but separate in its attachment thereto, and not forming an ordinary part thereof.

What we claim as our invention, and desire to secure by Letters Patent, is—

1. The employment, in connection with the turning float-arms *b*, of the boxes *c*, having a free action upon the reel-shaft, in the manner and for the purpose set forth.

2. The combination, with the turning float-arms *b*, of the segment-gears 2, cog-wheel 1, and springs *g*, arranged as described, and operating in the manner and for the purpose specified.

3. Arresting the motion of the arms *b*, to give the floats their sweeping motion to act as a rake, by means of the sliding rod *t*, which retreats when the arms are in the proper position to allow said floats to be restored in place again, the whole arranged substantially as described.

4. The combination of the adjustable heads *i* and teeth *h* with the floats *a*, arranged and operating as specified.

5. In combination with the floats *a*, the auxiliary head *l*, and the restoring-spring *p*, the whole so arranged that when the said floats act as a reel the auxiliary head stands upright out of the way, but when discharging the grain from the platform the auxiliary head is depressed and made to bear upon the cut grain, and thereby hold it compactly while being swept off, as herein set forth.

6. The arrangement, with the floats *a* and auxiliary heads *l*, of the stem *n* and cam-arm *o*, operating to depress said head, in the manner and for the purpose specified.

In witness whereof we have hereunto signed our names in the presence of two subscribing witnesses.

AARON PALMER.
CHAS. W. PALMER.

Witnesses:
  GEO. R. WARD,
  DARWIN STICKNEY.